June 5, 1945. J. D. RAUCH 2,377,574
DRIVING AXLE UNIT
Filed Aug. 9, 1943 2 Sheets-Sheet 2
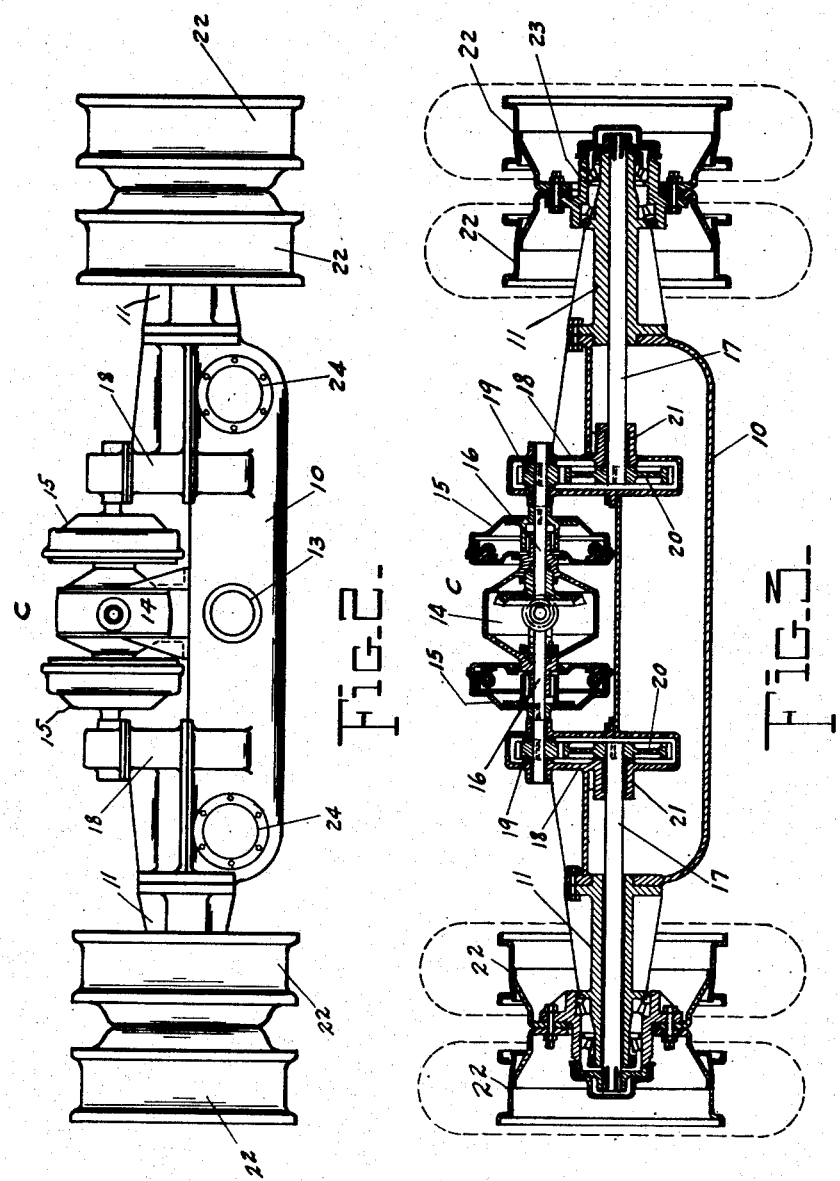
Inventor
John D. Rauch
By Robert Todd
Attorney Patented June 5, 1945

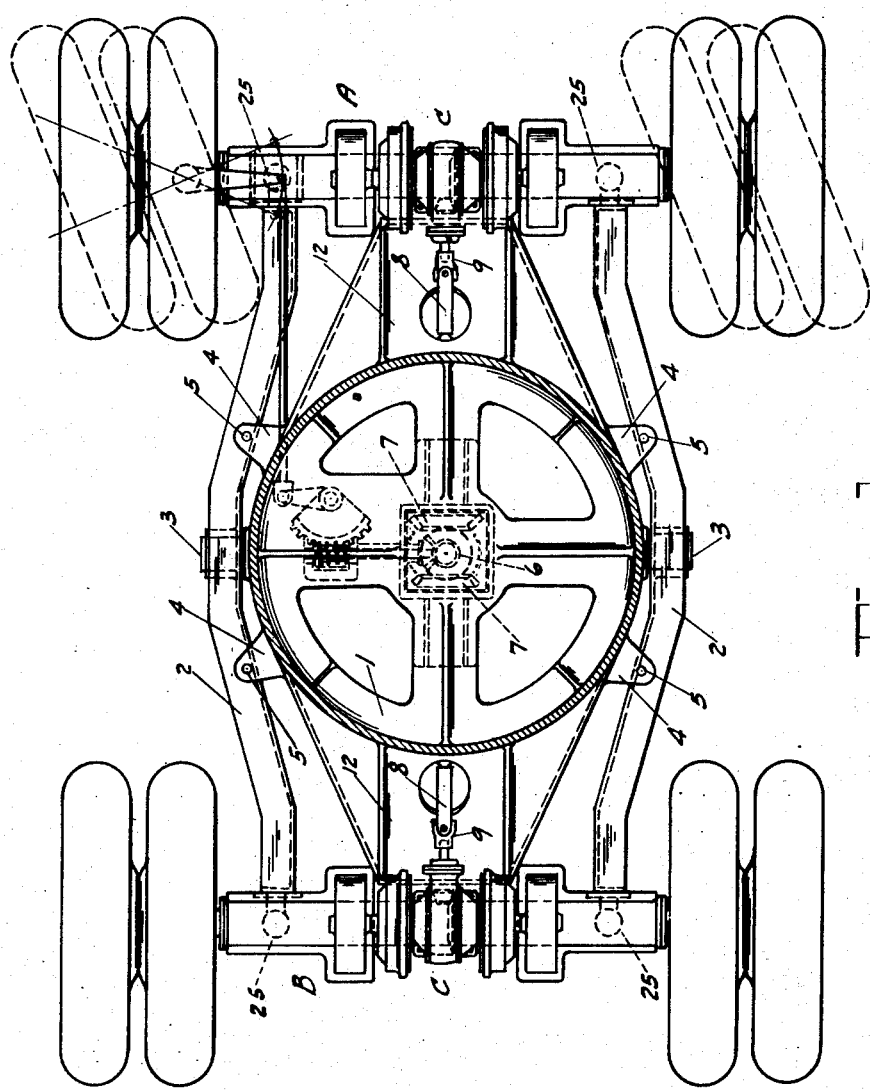

2,377,574

UNITED STATES PATENT OFFICE 2,377,574

DRIVING AXLE UNIT

John D. Rauch, Fort Wayne, Ind.

Application August 9, 1943, Serial No. 497,976

3 Claims. (Cl. 180—75)

My present invention embodies improvements in running gear for base traction structures for cranes and other types of machines, and the invention involves primarily a novel construction of driving axle unit for transmitting the drive from the engine or power plant on the crane or other body of the machine to the front and rear driving wheels. This invention embodies improvements in the construction of drive mechanism set forth in my Patent No. 2,343,800, issued March 7, 1944.

The primary object in the construction of the driving axle units has been to make provisions for the housing of the driving gears which carry the driving forces directly to the traction or driving wheels; also the construction of the unit in such a way as to readily adapt for use therewith conventional differential and brake units at present commonly in use.

My invention involves other detail features of construction of the axle unit as will appear more fully hereinafter in conjunction with the accompanying description and annexed drawings, in which:

Figure 1 is a horizontal sectional view through the base portion of a crane body illustrating somewhat diagrammatically the mounting of the drive axle units, turntable base, and transmission device for carrying the drive from the center-pin axis of the crane to the front and rear axle units.

Figure 2 is a front elevation of the rear axle unit alone and showing the tire removed from the wheel rims.

Figure 3 is a transverse vertical sectional view of the unit illustrated in Figure 2, dotted lines showing the tire carried by the wheel rims, the wheels being of the dual wheel type.

Since my present improvements appertain primarily to a drive axle unit structure, the general arrangement of these structures in conjunction with the machine will be described without great detailing thereof, said general arrangement being more fully shown in my patent above referred to and not being a part of the present invention.

Referring to Figure 1, it will be seen that the frame features of my machine include the supporting member 1 for the turntable or body of the crane, if the latter is of the full circle or rotating type. This supporting member is carried by a chassis composed of frame side members 2 having bearing openings intermediate their ends receiving lateral trunnions 3 projecting from the supporting member 1. The chassis side members 2, therefore, are adapted to rock relatively to the member 1 about the trunnions 3 as an axis, and limitation of the rocking movement is provided by means of stops 4 projected from the member 1 and having adjustable screws 5 for determining the extent of the rocking of the parts 2 relatively to the part 1.

The drive from the power plant carried in the cab or on the crane body supported by the supporting member 1, is carried through the centerpin axis 6 of the supporting member 1 in the well known manner and by the provision of suitable gears 7 and longitudinal shaft members 8 partly illustrated, the latter equipped with suitable universal joints 9. Said drive is carried to the front and rear axle units which are generally designated A and B respectively in Figure 1 of the drawings.

The axle units A and B are mounted spaced forwardly and rearwardly from the main supporting member 1, and, as seen in Figure 2, the said axle units comprise a central housing or section 10 and end bearing members 11 suitably rigidly connected together as a unit. The supporting member 1 has forward and rearward extensions 12 equipped with trunnions receivable in bearing parts 13, one of which projects rearwardly from the central portion of the front housing 10 and the other of which extends forwardly from the central portion of the rear housing 10 of the respective front and rear axle units. The above construction affords a pivotal or rocking connection between the central portions of the front and rear axle units and the member 1, thus providing for relative up and down movements of the wheels carried by each axle unit.

The drive of the power plant of the machine is taken from the shaft elements 8 and transmitted to the front and rear wheels by a known type of differential and brake unit generally shown at C in Figures 2 and 3. This unit may be a conventional Ford brake and differential unit, the differential feature being designated generally at 14 and the brake parts at 15. The units C for the front and rear axles are arranged to drive countershafts 16 superposed in relation to the wheel drive shafts 17 and disposed substantially intermediate the latter. The differential or countershafts 16 are mounted in housing members 18 forming parts of the central housing section of the axle unit. The said differential shafts 16 carry the upper drive pinions 19 of the spur type which mesh with the driven gears 20, the latter being keyed to the wheel shafts 17. The gears 19 are keyed to the shafts 16. The shafts 17 are mounted in bearings 21 of the central housing section 10 of each axle unit, and said parts 17 are also mounted in the end bearing members 11 which are attached to the central housing section 10, as previously described. The wheels employed are dual wheels and therefore the drive effect of the wheel drive shaft 7 is transmitted by conventional connecting means to the dual rims 22 supported on the conventional hub structure 23 common in the art of dual wheel vehicles today.

The central housing section 10 of each axle unit is provided with sockets or recesses 24 spaced from the trunnion receiving socket or opening 13 and at opposite sides thereof for receiving ball members 25 with which the opposite ends of the chassis side members 2 are equipped, said ball members establishing bearing connections between the opposite end of the members 2 and opposite end portions of the front and rear axle units.

By the construction of axle units as described above, it will be apparent that the differential drive shafts 16 with their differential gear connecting means and the brake units 15 as well as the differential unit 14 itself are disposed in a plane above the axis of the axle unit, assuming said axis to be the line of the shafts 17. Furthermore, the driving gears and associated parts at the central portion of each unit are fully housed by the central housing section 10 and the housing members 18 carried thereby, thus avoiding any liability of dirt or foreign matter lodging in the gearing by which the power transmitting forces are carried from the differential and brake units C to the driving axles 17.

The invention affords a simplified construction of parts for each axle unit and one which is adapted to be readily assembled, while at the same time the various parts of the differential gear units, brake units, and gearing are readily accessible in the event of requirements to make repairs or replacements.

Owing to the arrangement of the gear members 19 and 20, it will be evident that the construction is adapted for combination with conventional differential and brake units such as previously referred to herein, that shown being stated to be the Ford type now in common use.

The front axle unit used is substantially the same as the rear axle unit except provisions of a known class are employed whereby ball and socket connections between steering axle sections of the drive axles 17 are availed of, these, however, being known in the art and therefore not particularly described. They enable the employment of the ordinary steering arms capable of being operated from the superstructure or cab or turntable portion of crane type machine.

The steering is accomplished by a vertical center shaft passing through center driving shaft and controlled by means in the cab.

Having thus described my invention, what I claim as new and desire to secure by Letters Patent of the United States, is—

1. A driving axle unit of the class described, comprising, in combination, a central housing section, end bearing members united with and extending from the ends of said central housing section, wheel drive shafts supported by the end bearing members and having wheels drivably engaged with the outer ends of said drive shafts, the inner ends of said drive shafts extending into said central housing member and supported in bearings carried thereby, a single differential and brake unit mounted on differential driving shafts intermediate the inner ends of said wheel drive shafts, said differential driving shafts being supported by spaced housing members integral with the central housing section aforesaid, driven gears carried by the inner ends of said wheel drive shafts engaged with driving pinions on adjacent ends of said differential drive shafts and within the said spaced housing members, and driving means for the differential and brake unit aforesaid.

2. A driving axle unit as set forth in claim 1, wherein the differential driving shafts of the differential and brake unit are supported above and parallel to the wheel driving shafts, and wherein the differential and brake unit parts are disposed substantially between the housing members carried by the central housing section and which enclose the driving pinions and driven gears connecting the differential shafts to the wheel driving shafts.

3. A driving axle unit as claimed in claim 1, in which the central housing section is formed with a horizontally centered trunnion socket or opening and also formed at spaced intervals from said socket or opening with similar trunnion receiving sockets or openings adjacent to the ends of the section adapted to receive trunnions at the front ends of chassis or frame side members.

JOHN D. RAUCH.